United States Patent [19]

Barkley

[11] Patent Number: 4,682,766
[45] Date of Patent: Jul. 28, 1987

[54] X-Y-Z ROTATION POSITIONING SYSTEM USING FLEXIBLE MOUNTINGS

[75] Inventor: Vincent Barkley, Arlington, Va.

[73] Assignee: Pace, Incorporated, Laurel, Md.

[21] Appl. No.: 762,843

[22] Filed: Aug. 6, 1985

[51] Int. Cl.[4] ............................................. B23Q 1/18
[52] U.S. Cl. ..................................................... 269/71
[58] Field of Search .................. 350/531; 269/71, 73; 108/137, 143; 248/17, 399; 33/1 A; 74/441, 4 A, 8 R, 89.15; 408/91; 378/208; 250/442.1, 442.2

[56] References Cited

U.S. PATENT DOCUMENTS

| | | | |
|---|---|---|---|
| 3,044,354 | 7/1962 | Brosicke | 350/531 |
| 3,563,186 | 2/1971 | Piper | 350/531 |
| 3,870,416 | 3/1975 | Brady et al. | 350/531 |
| 4,157,818 | 6/1979 | Key | 269/73 |
| 4,317,560 | 3/1982 | Troyer | 269/71 |
| 4,577,845 | 3/1986 | Kimura et al. | 269/73 |

Primary Examiner—Robert C. Watson
Attorney, Agent, or Firm—Gerald J. Ferguson, Jr.; Ronni S. Malamud; Michael P. Hoffman

[57] ABSTRACT

A positioning apparatus for adjusting the position of a printed circuit board relative to a soldering/desoldering device, said positioning apparatus including elements for adjusting the work in the X and Y directions and the φ direction.

34 Claims, 15 Drawing Figures

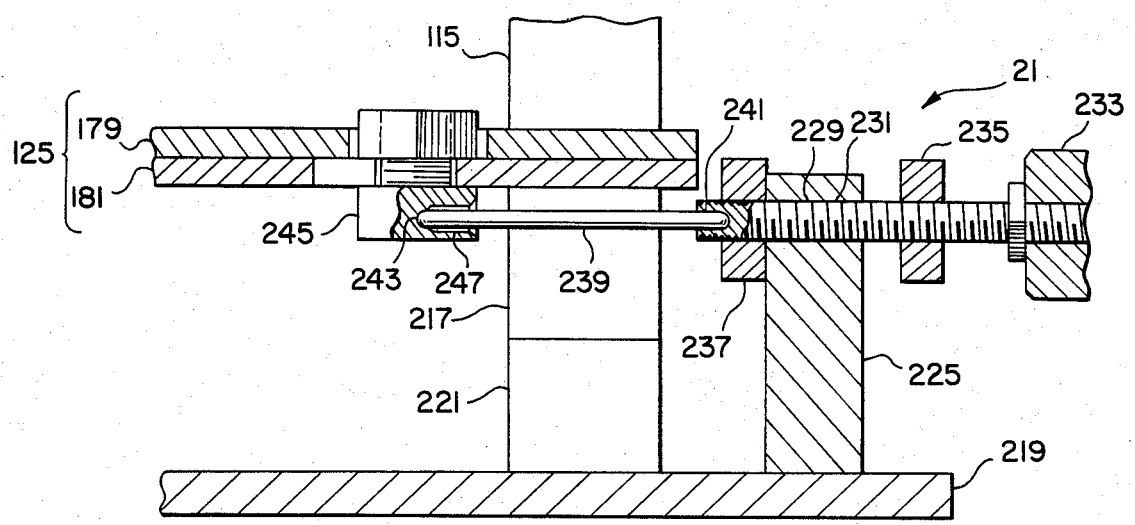
FIG. 3
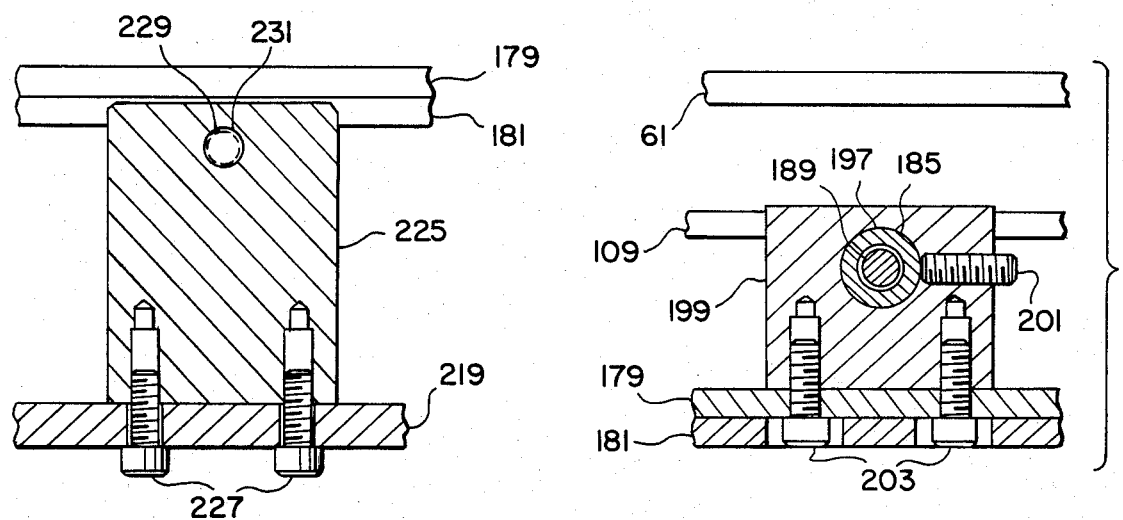
FIG. 4
FIG. 5
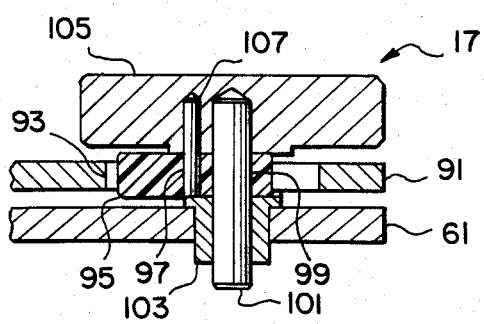
FIG. 6
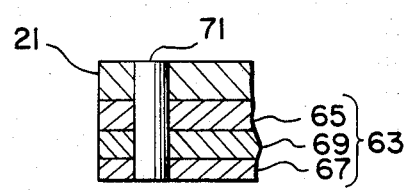
FIG. 7

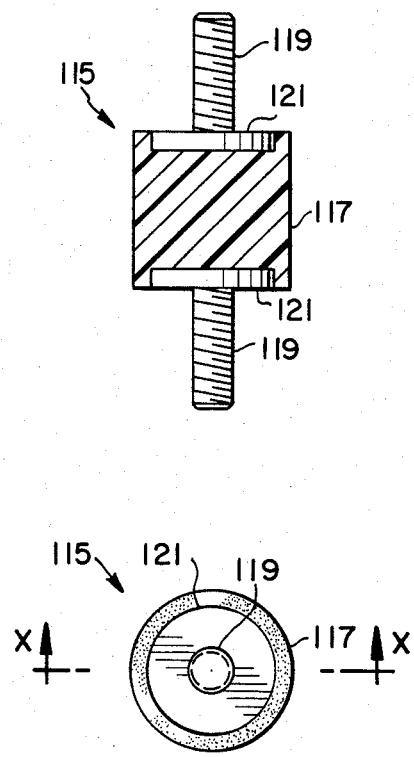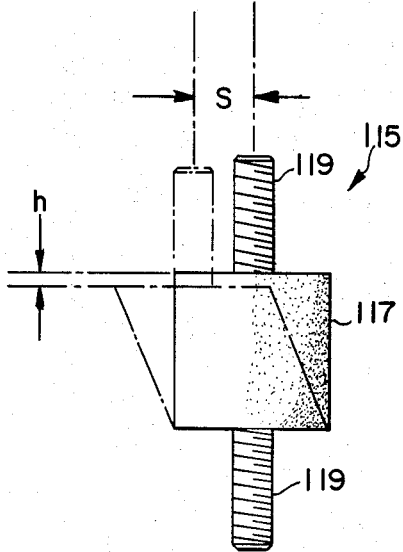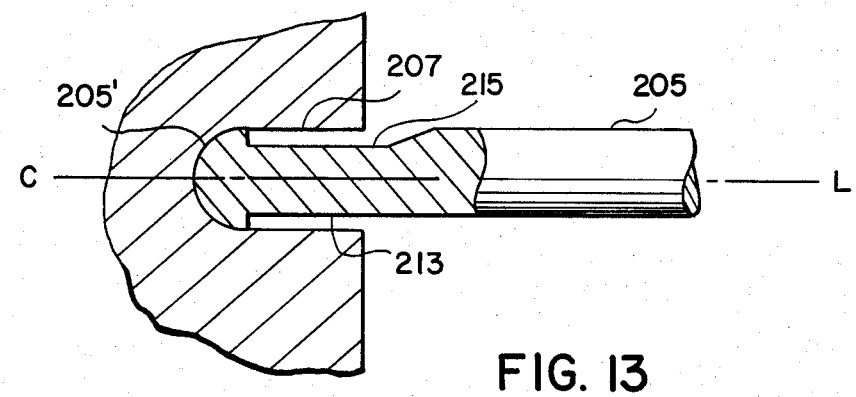

X-Y-Z ROTATION POSITIONING SYSTEM USING FLEXIBLE MOUNTINGS

BACKGROUND OF THE INVENTION

1. Field of the Invention:

This invention relates to a device for precisely positioning a workpiece relative to a tool which is to work on the workpiece. More particularly, this invention relates to a device for precisely positioning a printed circuit board relative to a solderer/desolderer for the attachment or removal of modular electronic components.

2. Description of the Prior Art

Present day devices for removing or installing modular electronic components from a substrate such as a printed circuit board generally fall into two categories: those which use a heated head which contacts each terminal to melt the solder thereon or those which use a blast of hot air to melt the solder. The former devices are generally very complex and employ a heated head having a plurality of spaced apart fingers each of which must be precisely aligned with each terminal around the component to simultaneously heat the solder on it. The component is then withdrawn from the substrate by vacuum suction or other mechanical means. The procedure is reversed for installing a component. An example of such a device is disclosed in U.S. Pat. No. 3,382,564. A major disadvantage of this type of device is that, due to the ever-increasing minaturization of electronic systems and individual components in them, the terminals of such components are extremely close together thus making precise alignment of the fingers of the heating head therewith extremely difficult. Improper alignment or contact often results in solder flowing between terminals on the component thus shorting them or otherwise damaging them. The latter devices direct a blast of hot air at the terminals from a source above the component to simultaneously melt the solder on each. Such a device, for example, is set forth in U.S. Pat. No. 4,366,925. Such a device may function satisfactorily if there is a large spacing between components such that the blast of hot air directed at one component from above will not spill over and melt the solder on the terminals of adjacent components. However, as aforementioned, not only are the components themselves becoming increasingly smaller but their proximity on the printed circuit substrate is also increasing. A device which cannot only provide a closely controlled and evenly distributed source of heat sufficient to melt solder associated with component terminals or printed substrate conductors during installation or removal of the electronic component relative thereto but one which can rapidly and precisely direct this controlled heat where desired thereby minimizing the likelihood of melting the solder on the terminals of adjacent components or otherwise damaging the printed conductors on the substrate is disclosed in commonly assigned, copending application Ser. No. 649,065, filed Sept. 10, 1984. However, this device for heating the solder associated with component terminals utilizes a precisely directed flow of hot air toward each component terminal or printed conductor on the substrate, which emphasizes the need to precisely position the nozzles from which the hot air is directed in relation to the component on the substrate which is to be removed or attached. Thus, there is a need for a device which has the capability of precisely positioning the electronic component and its terminals on the ends of the printed conductors on the substrate to insure no overlapping, during placement or removal, or that no liquid solder is smeared on the substrate between the conductors printed thereon.

SUMMARY OF THE INVENTION

Accordingly, it is an object of the present invention to provide a device for precisely positioning a workpiece relative to a tool.

It is a further object of the present invention to provide a device for precisely positioning circuits printed on a substrate relative to a tool for the installation and removal of electronic components.

It is a still further object of the present invention to provide a workpiece positioning device which is inexpensive to produce yet durable and accurate.

These objects and other objects of the invention, as will become apparent hereinafter are achieved by the present invention which provides a workpiece positioning apparatus for adjusting the position of a workpiece relative to a tool, the workpiece positioning apparatus comprising:

a workpiece holder, having an axis of rotation, for releasably holding a workpiece, the workiece holder being rotatable about the axis of rotation;

a first support for rotatably supporting the workpiece holder for rotation about the axis of rotation, the first support being movable substantially transversely of the axis of rotation. a second support for resiliently supporting the first support for movement substantially transversely of the axis of rotation, the second support yieldably resisting relative movement between the first support and the second support, the second support being movable substantially transversely of the axis of rotation;

a third support for resiliently supporting the second support for movement substantially transversely of the axis of rotation, the third support yieldably resisting relative movement between the second support and the third support, the third support being fixedly positionable relative to the tool;

a rotation actuator, operatively connected to the workpiece holder and the first support, for rotating the workpiece holder about the axis of rotation relative to the first support;

a first translator, operatively connected to the first support and the second support, for moving the first support, relative to the second support, in a first direction substantially transverse to the axis of rotation; and a second translator, operatively connected to the second support and the third support, for moving the second support, relative to the third support, in a second direction substantially transverse to the axis of rotation, the second direction being substantially transverse to the first direction.

BRIEF DESCRIPTION OF THE DRAWING

Other objects, details and advantages of the present invention will be more readily apparent in the light of the explanation which follows of a preferred embodiment of a device according to the invention, given only by way of example and with reference to the accompanying drawing in which:

FIG. 3 is a partial cross-sectional view of the workpiece positioning device according to the present invention, taken along line B—B in FIG. 1;

FIG. 4 is a partial cross-sectional view of the workpiece positioning device according to the present invention, take along line C—C in FIG. 1;

FIG. 5 is a partial cross-sectional view of the workpiece positioning device according to the present invention, taken along line D—D of FIG. 1;

FIG. 6 is a partial cross-sectional view of the workpiece positioning device according to the present invention, taken along line F—F of FIG. 1;

FIG. 7 is a partial cross-sectional view of the workpiece positioning device according to the present invention, taken along line G—G of FIG. 1;

FIGS. 11A and 11B are a cross-sectional view and an end view, respectively, of a resilient member for use in the workpiece positioning device of the present invention, the cross-sectional view (FIG. 11A) having been taken along line X—X in FIG. 11B;

FIG. 12 is a side view of the resilient member of FIGS. 11A and 11B showing the resilient member in undeformed (solid line) and deformed (chained line) states;

FIG. 13 is a cross-sectional view of alternative embodiments for the link pin member for use in the workpiece positioning device of the present invention.

DETAILED DESCRIPTION OF THE PREFERRED EMBODIMENT

Figure 1:
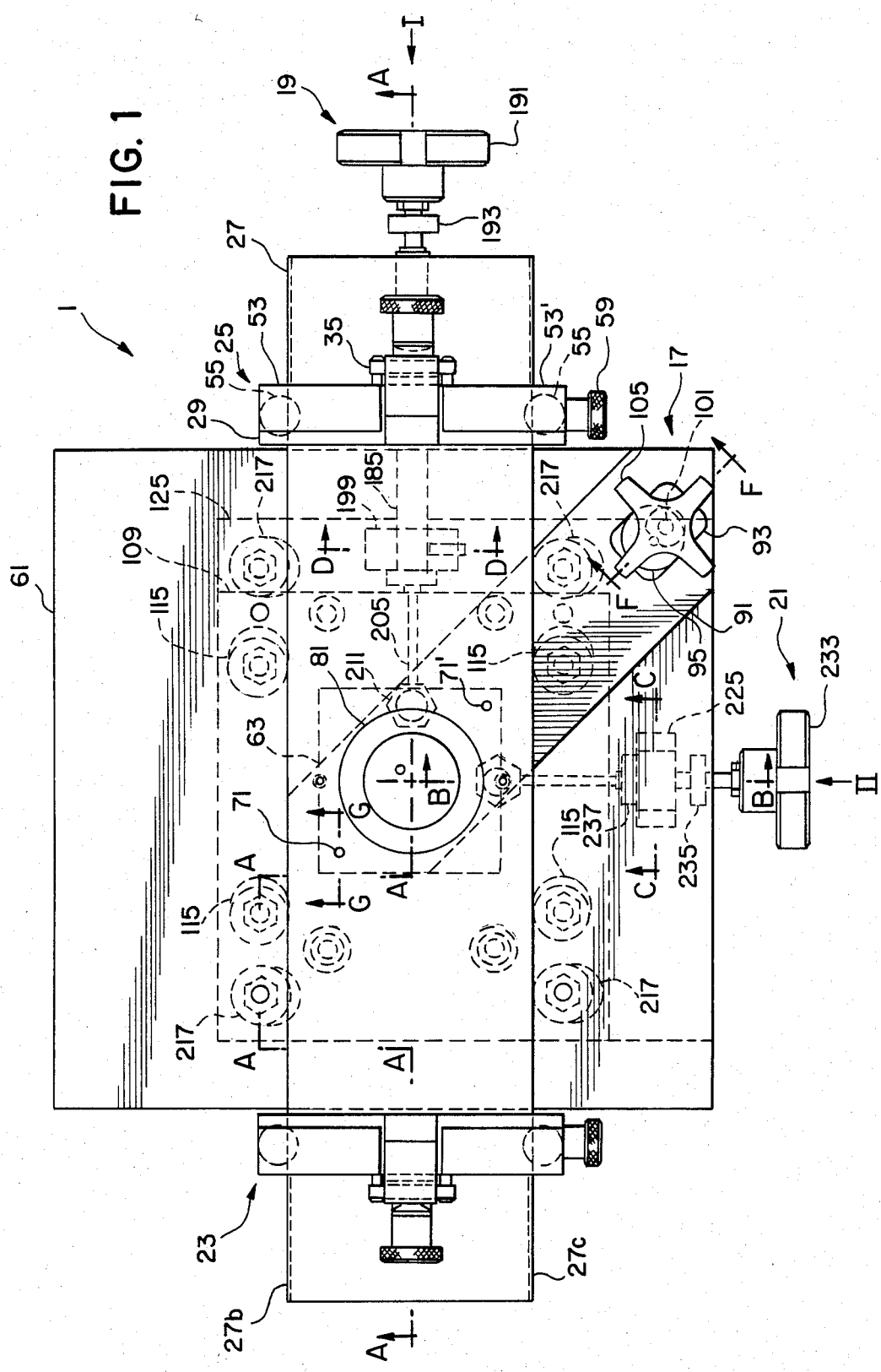
FIG. 1 is a top view of a workpiece positioning device according to the present invention.

Referring now to the drawings where like characters of reference refer to similar elements in each of the several views, FIG. 1 illustrates a top view of the workpiece positioning apparatus (generally indicated at 1) of the present invention. As may best be seen in FIG. 2, the workpiece positioning apparatus 1 comprises a workpiece holder, generally indicated at 3; a first support, generally indicated at 5; a second support, generally indicated at 7; and a third support, generally indicated at 9. The workpiece holder 3 is designed to support a printed circuit board 11 (as shown by the double dot-dash line in FIG. 2). The workpiece holder 3 is rotatable about an axis of rotation 0—0. The workpiece holder 3 is supported for rotation about the axis 0—0 by the first support 5. The first support 5 is movable substantially transversely of the axis 0—0. The first support 5 is resiliently supported for movement substantially transversely of the axis 0—0 by the second support 7. The second support 7 is inturn resiliently supported for movement substantially transversely of the axis 0—0 by the third support 9. The third support 9 may be fixed to the base of a tool support (generally indicated by the triple dot-dash line 13) by screws or bolts 15 or any other suitable means for rigid fastening of two components to one another.

The workpiece positioning apparatus 1 also includes a rotation actuator, generally indicated at 17; a first translator, generally indicated at 19; and a second translator, generally indicated at 21. The rotation actuator 17 is connected to the workpiece holder 3 and the first support 5 so as to rotate the workpiece holder 3 about the axis 0—0 relative to the first support 5. The first translator 19 is connected to the first support 5 and the second support 7 for moving the first support 5, relative to the second support 7, in a first direction (generally indicated by the arrow labelled I) substantially transverse to the axis 0—0. The second translator 21 is connected to the second support 7 and the third support 9 for moving the second support 7, relative to the third support 9, in a second direction (generally indicated by the arrow labelled II) substantially transverse to the axis 0—0. The second direction (arrow II) is substantially transverse to the first direction (arrow I).

Figure 2:
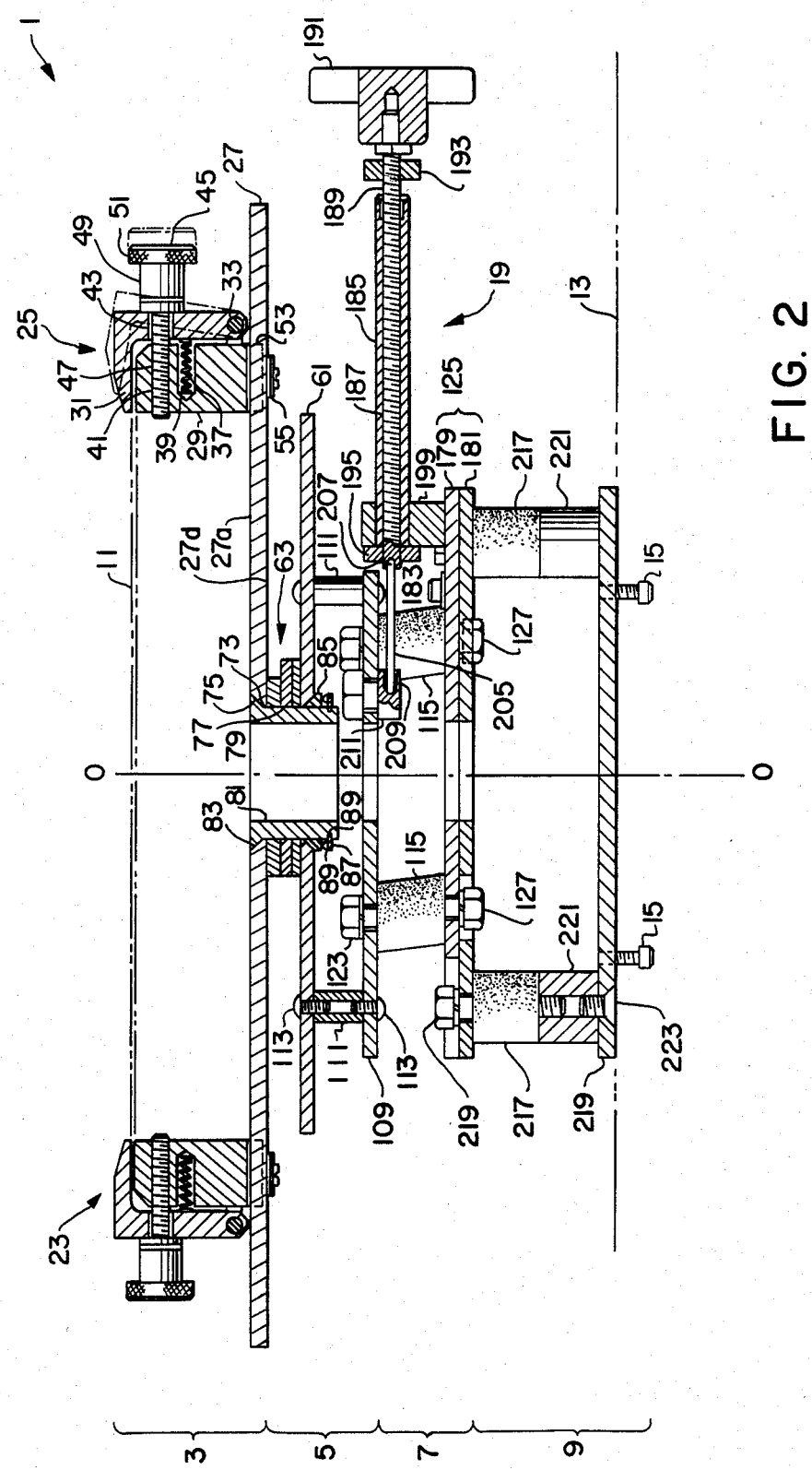
FIG. 2 is a cross-sectional view of the workpiece positioning device according to the present invention, taken along line A—A in FIG. 1.

Turning now to FIG. 2, the workpiece holder 3 comprises a first clamp 23 for clampingly engaging a portion of the circuit board 11, a second clamp 25 for clampingly engaging another portion of the circuit board 11, and a first planar support (in the form of a first plate 27) for slidingly supporting the first clamp 23 and the second clamp 25 for movement in the plane of the first plate 27, which is substantially transverse to the axis 0—0.

Each of the first clamp 23 and the second clamp 25 (illustrating only with respect to the second clamp 25) comprises a first jaw 29 for supportingly engaging a portion of the circuit board 11 and a second jaw 31, which is pivotally connected via pivot pin 33 and bracket 36 to the first jaw 29, which also engages a portion of the circuit board 11. The second jaw 31 is movable from a first position (shown in dot-dash lines in FIG. 2) free of the circuit board 11 to a second position (shown in solid lines in FIG. 2) engaging the circuit board 11, whereby the circuit board 11 may be clamped between the first jaw 29 and the second jaw 31. A biasing spring 37 is received within a recess 39 formed in the first jaw 29 and presses on the second jaw 31 to yieldably urge the second jaw 31 to yieldably urge the second jaw 31 to its first position. A threaded bore 41 is also formed in the first jaw 20 and this threaded bore 41 substantially aligns with a bore 43, of greater diameter, passing through the second jaw 31. An adjustment screw 45 having a threaded portion 47 received within the threaded bore 41, an enlarged portion 49 and a manually grippable handle portion 51 may be utilized to apply pressure to the second jaw 31 to move the second jaw from its firt position to its second position and thence to apply pressure to the second jaw 31 to clamp the circuit board between the first jaw 29 and the second jaw 31.

A portion 53, 53' of the first jaw 29 extends below the top surface 27a of the first plate 27 at the edges 27b, 27c thereof. A washer 55 extends beneath the lower surface 27d of the first plate 27 and is held in place on the first jaw 29 by screw 57 or any other suitable means. The washers 55 and the portions 53, 53' of the first jaw 29 form a guideway to retain the first jaw 29 in sliding contact with plate 27. The first jaw 29 can be locked in place by set screw 59 which bears on the edge 27c of first plate 27.

Figure 8:
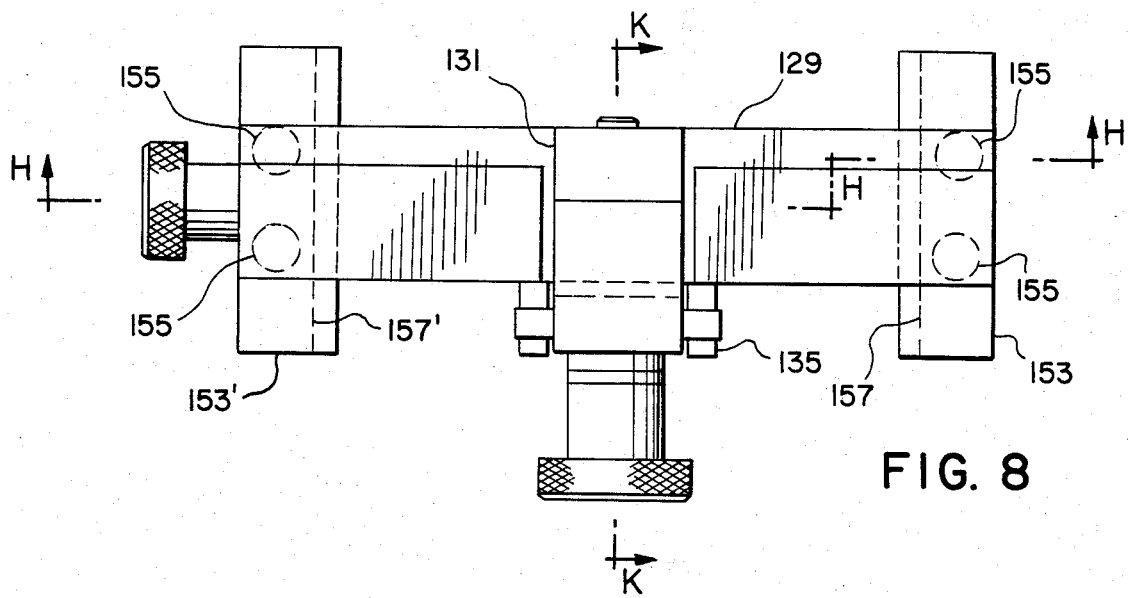
FIG. 8 is a top view of a particularly preferred clamp for use in the workpiece positioning device of the present invention.
Figure 9:
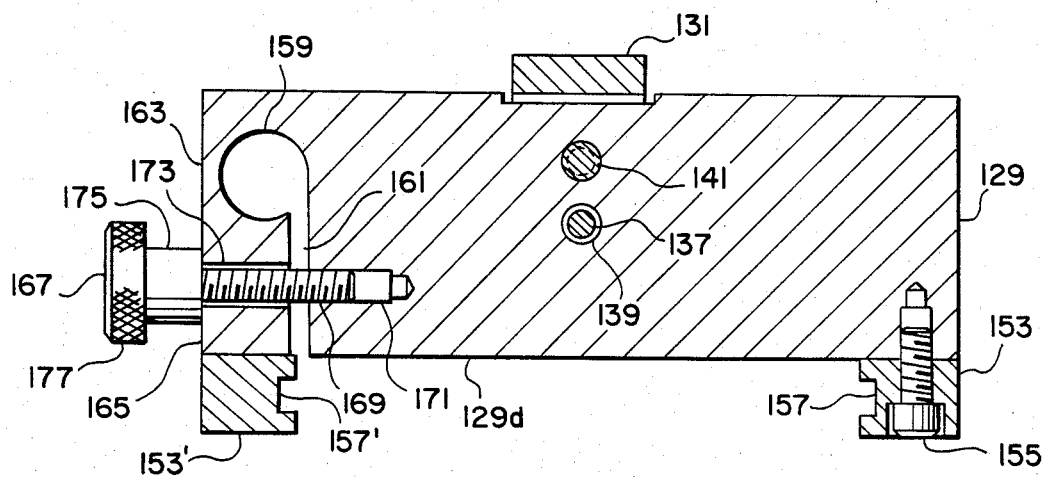
FIG. 9 is a cross-sectional view of the particularly preferred clamp for use in the workpiece positioning device of the present invention, taken along line H—H of FIG. 8.
Figure 10:
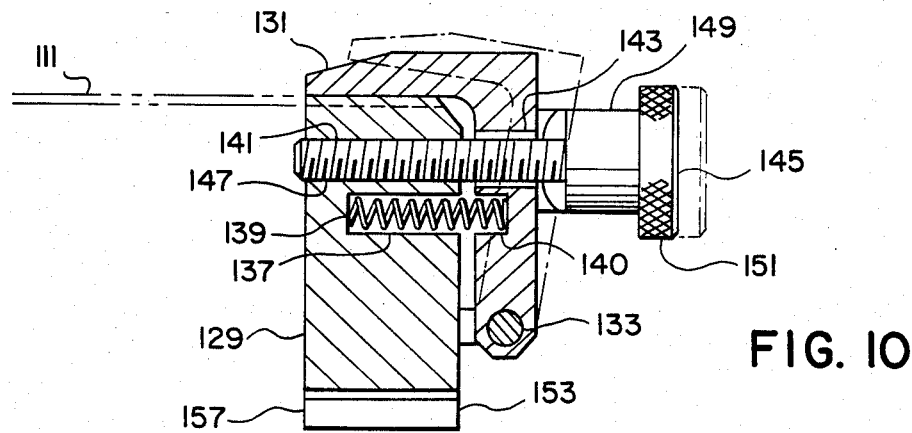
FIG. 10 is a cross-sectional view of the particularly preferred clamp for use in the workpiece positioning device of the present invention, taken along line K—K of FIG. 8.

A particularly preferred embodiment of the clamps 23, 25 is illustrated in FIGS. 8–10. As shown in these figures, each of the clamps 23, 25 comprise a first jaw 129 for supportingly engaging a portion of the circuit board 111 and a second jaw 131, which is pivotally connected via pivot pin 133 and bracket 135 to the first jaw 129, which also engages a portion of the circuit board 111. The second jaw 132 is movable from a first position (shown in dot-dash lines in FIG. 10) free of the circuit board 111 to a second position (shown in solid lines in FIG. 10) engaging the circuit board 111, whereby the circuit board 111 may be clamped between the first jaw 129 and the second jaw 131. One end of a biasing spring 137 is received within a recess 139 formed in the first jaw 129 and the other end of the biasing spring 137 is received within a corresponding recess 140 formed in the second jaw 131. The biasing spring 137 yieldably urges the second jaw 131 to its first position. A threaded bore 141 is also formed in the first jaw 10 and this threaded bore 141 substantially aligns with a bore 143, of greater diameter, passing through the second jaw 131. An adjustment screw 145 having a threaded portion 147 received within the threaded bore 141, an enlarged portion 149 and a manually grippable handle portion 151 may be utilized to apply pressure to the second jaw 131 to move the second jaw from its first position to its second position and thence to apply pressure to the second jaw 131 to clamp the circuit board between the first jaw 129 and the second jaw 131.

A pair of slides 153, 153' are each attached to a respective end of the first jaw 129 by a pair of screws 155 so as to prevent relative rotation between the first jaw 129 and each slide 153, 153'. Each slide 153, 153' has an inwardly opening channel 157, 157' formed therein, these channels slidingly engaging the parallel edges 27b, 27c of the first plate 27. Thus, these slides 153, 153' permit movement of the first jaw 129 in a direction parallel to the parallel edges 27b, 27c of the first plate 27 and prevent movement of the first jaw 129 in a direction transverse to the parallel edges 27b, 27c of the first plate 27.

In this particularly preferred embodiment, as best seen in FIG. 9, a bore 159 passes through he first jaw 129 above and parallel to the slide 153'. A cutout 161 connects the bore 159 with the bottom side 129d of the first jaw 129, whereby a hinge portion 163 is formed so that jaw portion 165 can be moved relative to the remainder of the first jaw 129. Thus, slide 153' can be moved closer to slide 153 so as to lock the first jaw 129 in place on first plate 27. Relative movement of the jaw portion 165 is effected by the pressure applied by lock screw 167. In particular, lock screw 167 has a threaded portion 169 which engages a correspondingly threaded recess 171 in the first jaw 129. The threaded portion passes through a bore 173, of greater diameter than threaded portion 169, in jaw portion 165. Outboard of jaw portion 165, the lock screw 167 has an expanded portion 175, of greater diameter than bore 173, and a manually grippable portion 177. Thus, by turning lock screw 167 in a first direction, pressure may be brought to bear on jaw portion 165 whereby the first jaw 129 is locked in place by the gripping action of slides 153, 153' on first plate 27. By turning the lock screw 167 in the opposite direction, the natural resilience of hinge portion 163 will move the slides 153, 153' away from each other, thus, allowing first jaw 129 to be slid along first plate 27.

Returning to FIG. 2, the first support 5 comprise a second plate 61 disposed transversely to the axis of rotation 0—0. A spacer 63 holds the first plate 27 and second plate 61 in spaced apart parallel relationship. As may best be seen in FIG. 7, the spacer 63 comprises a first spacer plate 65 in contact with first plate 27, a second spacer plate 67 in contact with second plate 61, and a third spacer plate 69 sandwhiched between the first and second spacer plates. A pair of pins 71, 71' rigidly connect the spacer 63 with the first plate 27 while allowing the spacer to slidingly engage the second plate 61. An aperture 73, coaxial with the axis of rotation 0—0, and having an outwardly flared portion 75 is formed through first plate 27. A coaxially aligned, corresponding aperture 77 is formed in the spacer 63. Another coaxially aligned, corresponding aperture 79 is formed in the second plate 61. A collar 81 having a flared portion 83, corresponding to the flared portion 75 of aperture 73, is slidingly received within the three axially aligned apertures 73, 77, 79. The collar 81 is in the form of a hollow cylinder. A ring 85 is slidingly disposed coaxially about the outer periphery of the collar 81. A split-ring retaining ring 87 is disposed within a circumferential groove 89 formed in the collar 81. the split-ring retaining ring 87 supports one or more wave springs 89 (or any other suitable biasing spring) so as to force the ring 85 into engagement with the second plate 61, whereby the first plate 27 and the second plate 61 clamp the spacer 63 therebetween.

In order to effect relative rotation between the first plate 27 and the second plate 61, the third spacer plate 69 is fitted with a lever arm 98 which forms a portion of rotation actuator 17. The lever arm 91 is provided with a slot 93 therein and a substantially circular disc-like bearing 95 is slidingly received within the slot, parallel to the lever arm 91. The disc-like bearing 95 has a first aperture 97 formed through its center and a second aperture 99, parallel to the first aperture 97 formed therethrough at a position remote from the center. A shaft 101 is received within the aperture 99, one end of the shaft 101 releasably rotatably supported by a support bearing 103 carried by second plate 61, the other end of the shaft 101 fixedly connected to a manually grippable handle 105. A pin 107 is received within the aperture 97 and fixedly connected to the handle 105, whereby rotation of the handle 105 produces eccentric rotation of the bearing 95 about the shaft 101, which in turn causes the bearing 95 to move lever arm 91 and thereby rotate first plate 27 relative to second plate 61. It should be noted that second spacer plate 67 is of a sufficient thickness to allow lever arm 91 to rotate freely above second plate 61 and first spacer plate 65 is of sufficient thickness to allow the first and second clamps, 23 and 25, to ride freely on first plate 27 without interfering with lever arm 91. Additionally, if it is found that a greater degree of rotation than that provided by rotation actuator 17 is needed, then the handle 105 and bearing 95 assembly may be removed from slot 93 by sliding shaft 101 out of bearing 103 and then manually moving lever arm 91 as needed.

Returning once again to FIG. 2, the second plate 61 is supported by a third plate 109 by a plurality of hollow collars 111 which are connected to each of the second and third plates by screws 113 or any other suitable fasteners which will hold the plates in spaced apart parallel relationship.

The second support 7 comprises a number of first resilient members 115, four being shown, which support plate 109 and hence plate 61 for movement substantially transversely of the axis of rotation 0—0. As may best be seen in FIGS. 11A, 11B and 12, these resilient members 115 comprise a cylindrical body 117 of a flexible or resilient material, such as rubber or plastic, having a screw 119 bonded to each end thereof. Desirably, the screw 119 has a base portion 121 of larger diameter whereby the screw 119 is attached to the cylinder body 117 by a suitable adhesive or, preferably, by vulcanization. As may best be seen in FIG. 12, the screws 119 which are normally aligned with one another along the axis of the cylindrical body 117 may be translated with respect to one another in a direction transverse to the axis of the cylndrical body 117 by shearing the resilient material of the cylindrical body 117. As may be readily ascertained, translation of the screws 119 relative to each other by a distance "S" will result in a decrease "h" in the effective height of the cylindrical body 117. However, this change in height does not adversely effect the present invention, since, as will be explained hereinafter, the tool for operating on the workpiece is generally vertically adjustable.

The first resilient members are rigidly connected to third plate 109 by nuts 123 and to plate assembly 125 by nuts 127. The plate assembly 125 is movable substantially transversely of the axis of rotation 0—0. The plate assembly 125 comprises a fourth plate 179, disposed substantially transversely to axis 0—0, in sliding contact with a fifth plate 181, also disposed substantially transversely to axis 0—0. The fourth plate 179 and the fifth plate 181 may be releasably fixedly connected together by screws 183 which engage the fifth plate 181 but ride in slots (not shown) in the fourth plate 179.

The third plate 109 can be moved, in a first direction transverse to the axis 0—0, relative to plate assembly 125 by the first translator 19. The first translator 19 comprises a tubular member 185 having an axis aligned along a first direction transverse to the axis 0—0, the tubular member 185 having a threaded axial bore 187 therethrough. A correspondingly threaded rod 189 is threadingly received in the axial bore 178, whereby rotation of the threaded rod 189 in a first rotary direction generates a force in the first direction transverse to the axis 0—0 and rotation of the threaded rod 189 in a direction opposite to the first rotary direction generates a force in a direction opposite to the first direction transverse to the axis 0—0. The threaded rod 189 is fitted with a manually grippable handle 191 to facilitate rotation thereof. The threaded rod 189 also has a first stop washer 193 releasably fixed thereto (by a step screw (not shown)) to limit the amount of rotation in the first rotary direction, and hence the amount of movement in the first direction transverse to the axis 0—0; and a second stop washer 195 releasably fixed thereto (by a set screw (not shown)) to limit the amount of rotation in the direction opposite to the first rotary direction, and hence the amount of movement in the direction opposite to the first direction transverse to the axis 0—0. As may best be seen in FIG. 5, the tubular member 185 is received within an aperture 197 in a block member 199. The aperture 197 has an axis aligned along the first direction transverse to the axis 0—0, and the tubular member 185 is coaxially received within the aperture 197. The tubular member 185 is releasably locked into aperture 197 by set screw 201. The block member 199 is rigidly connected to the plate assembly 125 by screws 203 which pass through fourth plate 179.

The threaded rod 185 is linked to third plate 109 by link pin 205 which has a first rounded end received in a recess 207 in the end of threaded rod 187 and a second rounded end received in a recess 209 in bolt head 211 rigidly connected to third plate 109. Each of the recesses 207 and 209 are counter bored so that the link pin 205 is universally pivotable therein. As may best be seen in FIG. 2, the second stop washer 195 is positioned so that the first resilient members 115 are under a slight shearing force, so that link pin 205 is always subject to compressive force to retain link pin 205 in recesses 207 and 209.

FIG. 13 illustrates alternative embodiments of the link pin 205, wherein rather than counterboring the recess 207 (or 209), the shaft of the link pin 205 may be cut back 213 along its entire length, as shown below centerline C—L, from the diameter of the rounded head 205'; or the shaft of the link pin 205 can be cut back 215 over only a portion of its length, as shown above centerline C—L, so as to provide a clearance for universal pivotal movement of the link pin.

The third support 9 comprises a number of second resilient members 217, four being shown, which support plate assembly 125 for movement substantially transversely of the axis of rotation 0—0. These second resilient members 217 are identical in design and function with the first resilient members 115. The second resilient members are rigidly connected to plate assembly 125 by nuts 219 and to sixth plate 219 by hollow collars 221 and screws 223. The sixth plate 219 is disposed substantially transversely to axis of rotation 0—0 and is rigidly fixable to the base of a tool support (generally indicated by triple dot-dash line 13) by screws or bolts 15, as previously noted.

It should be noted that plate assembly 125 is connected to the first resilient members 115 through fourth plate 179; and is connected to the second resilient members 217 through fifth plate 181. Since plates 179 and 181 are slidable with respect to each other, the plate assembly 125 can be used to adjust the relative positions of second and third supports, 7 and 9, with respect to each other; and then be locked into position by screws 183.

The plate assembly 125 can be moved, in a second direction transverse to the axis 0—0, relative to the sixth plate 219 by the second translator 21. As best seen in FIGS. 3 and 4, the second translator 21 comprises a second block member 225 fixedly connected to the sixth plate 219 as by screws or bolts 227. The second block member 225 has a threaded bore 229 therethrough. The threaded bore 229 has an axis aligned along the second direction transverse to the axis 0—0. A correspondingly threaded rod 231 is threadingly received in the threaded bore 229, whereby rotation of the threaded rod 231 in a first rotary direction generates a force in the second direction transverse to the axis 0—0 and rotation of the threaded rod 231 in a direction opposite to the first rotary direction generates a force in a direction opposite to the second direction transverse to the axis 0—0. The threaded rod 231 is fitted with a manually grippable handle 233 to facilitate rotation thereof. The threaded rod 231 also has a third stop washer 235 releasably fixed thereto (by a set screw (not shown)) to limit the amount of rotation in the first rotary direction, and hence the amount of movement in the first direction transverse to the axis 0—0; and a fourth stop washer 237 releasably fixed thereto (by a set screw (not shown)) to limit the amount of rotation in the direction opposite to the first rotary direction, and hence the amount of movement in the direction opposite of movement in the direction opposite to the first direction transverse to the axis 0—0.

The threaded rod 231 is linked to fifth plate 181 by link pin 239 which has a first rounded end received in a recess 241 in the end of threaded rod 231 and a second rounded end received in a recess 243 in bolt head 245 rigidly connected to plate assembly 125. Each of the recesses 241 and 243 are counter bored (as best shown in FIG. 3 at 247) so that link pin 239 is universally pivotable therein. As may best be seen in FIG. 3, the fourth stop washer 237 is positioned so that the second resilient members 217 are under a slight shearing force, so that link pin 239 is always subject to compressive force to retain link pin 239 in recesses 241 and 243. As may be readily ascertained, link pins 205 and 239 operate in identical manners.

Figure 14:
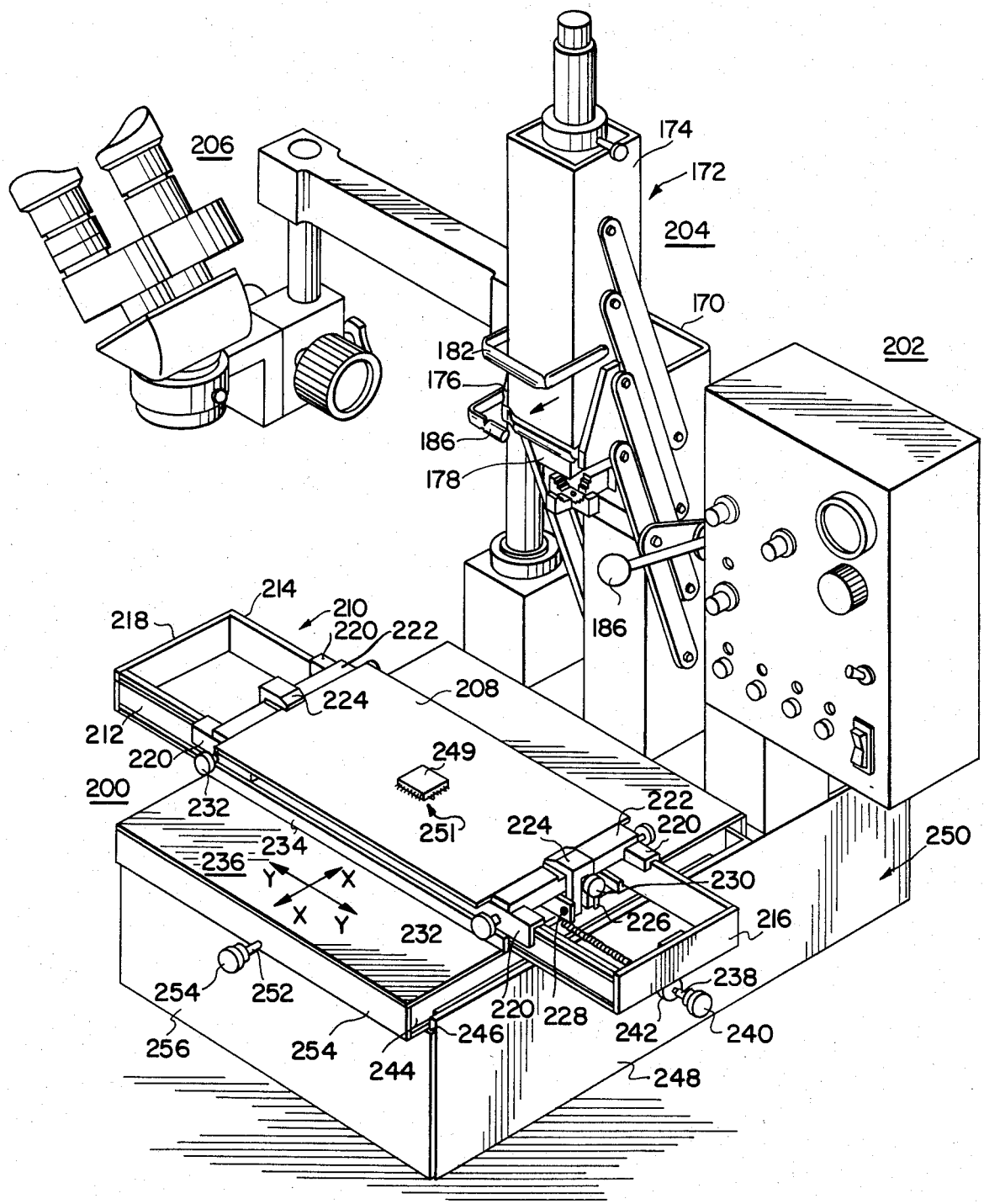
FIG. 14 illustrates a prior art workpiece positioning device connected to a solderer/desolderer apparatus.

FIG. 14 illustrates a prior art workpiece positioning system in place relative to a soldering/desoldering tool. In particular, as shown in FIG. 14, there is a workpiece manipulating unit 200, a control unit 202, a component removal/installation unit 204, and a microscope unit 206. Unit 200 is adapted to receive a printed circuit board 208. Generally the board will have mounted thereon a number of semiconductor components or modules, one of which is indicated at 249 where each module includes a plurality of terminals 251. The board is held in place by a retaining member generally indicated at 210. Unit 210 includes a pair of rails 212,214 connected together at the ends thereof by plates 216 and 218. Slidably mounted on rails 212,214 are slides 220. Connecting slides 220 are bars 222. Pivotally mounted with respect to bars 222 are clamps 224 for clamping board 208 with respect to bars 222. Mounted on each of the bars 222 are a pair of brackets 226. Disposed between each bracket pair is a pivot pin 228 for pivotally mounting clamp 224. Locking screws 230 are provided with knurled knobs and threaded through clamps 224 to engage bars 222 to thus lock clamps 224 in place once board 208 has been appropriately positioned between the clamps, Locking screws 232 also have knurled knobs are threaded through slides 222 to engage rails 212 and 214 to lock the board 208 with respect to the rails. The rails 212,214 are slidably mounted in a pair of guides 234 which are fixedly mounted on a movable plate 236.

Fine positional adjustment is provided by an adjusting screw 238 having a knurled knob 240, screw 238 being threaded through a bracket 242 connected to place 216 and a side wall 244 of mounting plate 236. Hence, by rotation of screw 230, the board mounting member 210 can be longitudinally positioned along guides 234 to effect fine positioning in a first direction.

Fine positioning in the direction perpendicular to the first direction is effected in the following manner. Movable mounting plate 236 is slidably mounted in a pair of guides 246 provided at the upper insides surfaces of the side walls 248 of a stationary base member generally indicated at 250. Movable mounting plate 236 may be slid along guides 246 by adjusting screw 252 having knurled knob 254, the screw being threaded through a front wall 254 of the mounting plate and through the front wall 256 of base number 250.

It should be noted that module 249, as illustrated in FIG. 14, corresponds to a module generally known as a flat-pac carrier where the terminals 251 are flexible and extend outwardly from the main body of the module. The present invention may be used not only with this type module but also with one known as a leadless chip carrier (LCC). Typically the terminals of a LCC module do not extend outwardly from the body, but are disposed on the underside thereof around the periphery.

Control unit 202 includes a control for the amount of time heated air is applied to the terminals to be soldered or desoldered; a control for the current through the heater to thus control the temperature thereof; a control for pressure of the air delivered to the unit, with a gauge indicating the air pressure level; and a control for a pre-heater. Once the heater reaches the level corresponding to the temperature set, the temperature will be maintained at that level. Furthermore, after a predetermined time (typically 45 seconds), air will start to flow from a pump through the heater, it being assumed that after the predetermined time the heater will have reached the temperature set. After the heated air has been applied for a predetermined time, a light starts to flash thereby indicating to the operator vacuum should either be (a) applied to the component if it is being removed or (b) removed therefrom if it is being installed.

Component removal/installation unit 204 includes a support column 170 upon which is pivotally mounted a component removal/installation device generally indicated at 172.

Unit 172 is adapted to receive a vacuum for manipulating the semiconductor module or component to be removed from or installed on the board. Generally, unit 172 comprises two separable parts comprising a heater unit 174 and a nozzle locator unit 176, the purpose of the heater unit being to apply heated air to the terminals of the semiconductor module and vacuum thereto for manipulation purposes and the purpose of the nozzle locator unit 176 being to accurately locate the heater unit 174 with respect to the semiconductor module.

Nozzle locator unit 176 can be positioned directly over module 249 by rotating it from its inoperative position shown in FIG. 14 to its position over the module. The module may then be accurately positioned beneath the nozzle locator.

The present invention may be employed in either the removal or installation of a component. The removal of a component will be discribed. Referring to FIG. 14, it is assumed component 249 is to be removed. First, it is generally positioned in the middle of workpiece manipulating unit 200. This is effected by first appropriately positioning the board 208 between clamps 204 and then tightening the clamps via tightening screws 230 to thus effect rough positioning of component 249 in the X direction indicated in FIG. 14. The board is then moved along rails 234 to thereby roughly position the component in the Y direction where the X and Y directions are orthogonal. Locking screws 232 are then tightened to secure this first rough position.

In order to provide more precise positioning of the component 209, the operator next pulls handle 186 in the direction of the arrow A in FIG. 14 to separate nozzle locator unit 176 from heater unit 174 whereby the nozzle locator 178 is moved into a position generally over module 249. preferably the locator is positioned onequarter to one-half inch above module 249 and clamped in this position by moving locking lever 186 in the clock wise direction. The component 249 may now be viewed through an opening in locator 178. Although a member using cross hairs can be employed to effect precise alignment of the module with respect to the nozzle locator, such a member need not be employed.

Rather, the nozzle locator is chosen so that the lower opening thereof is only slightly greater than the periphery of the component 249. Thus, it has been found that final precise adjustment of the position of components 249 with respect to nozzle locator 178 can be effected by first turning fine adjustment screw 238 whereby component 249 will be slightly shifted in the X direction until precise alignment is effected in this direction. Next, fine adjustment screw 252 is turned to effect precise alignment in the Y direction to thereby complete the fine adjustment of component 249 with respect to the nozzle locator. After clamp 186 is release, the nozzle locator is then reattached to heater unit 174 by pivoting it via handle 186 back to the position shown in FIG. 14. Unit 172 including both units 174 and 176 is then returned to module 249 by pulling handle 182 whereby unit 172 will not be accurately positioned with respect to the module and preferably in direct contact with board 208 or the terminals of the component.

As will be readily appreciated, the present workpiece positioning apparatus corresponds to the workpiece manipulating unit 200 of the prior art. However, the present invention provides not only the capability of precise positionng in the X-Y plane, but also the capability of rotation about the Z-axis (perpendicular to the X-Y plane). More importantly, however, the present invention does not require the utilization of precisely machined guides and slides as in the prior art to effect translations in the X-Y plane, but rather requires only relatively cheap resilient members yet achieves at least equivalent positional precision. Moreover, the utilization of the present resilient member provides an apparatus of enhanced durability, i.e., bumps and jars being absorbed by the resilient members rather than the possibility of bending precisely machined guides and slides.

What is claimed is:

1. A workpiece positioning apparatus for adjusting the position of a workpiece relative to a tool, said workpiece positioning apparatus comprising:

workpiece holding means, having an axis of rotation, for releasably holding a workpiece, said workpiece holding means rotatable about said axis;

first support means for rotatably supporting said workpiece holding means for rotation about said axis, said first support means movable substantially transversely of said axis;

second support means for resiliently supporting said first support means for movement substantially transversely of said axis, said second support means yieldably resisting relative movement between said first support means and said second support means, said second support means movable substantially transversely of said axis;

third support means for resiliently supporting said second support means for movement substantially transversely of said axis, said third support means yieldably resisting relative movement between said second support means and said third support means, said third support means fixedly positionable relative to said tool;

rotation actuation means, operatively connected to said workpiece holding means and said first support means, for rotating said workpiece holding means about said axis of rotation relative to said first support means;

first translation means, operatively connected to said first support means and said second support means, for moving said first support means, relative to said second support means, in a first direction substantially transverse to said axis of rotation;

second translation means, operatively connected to said second support means and said third support means, for moving said second support means, relative to said third support means, in a second direction substantially transverse to said axis of rotation, said second direction substantially transverse to said first direction.

2. The workpiece positioning apparatus according to claim 1, wherein said workpiece holding means comprises a first clamping means for clampingly engaging a first portion of said workpiece and a second clamping means for clampingly engaging a second portion of said workpiece, said first clamping means movable substantially transversely of said axis, said second clamping means movable substantially transversely of said axis.

3. The workpiece positioning apparatus according to claim 2, wherein said workpiece holding means further comprises a first planar support means for slidingly supporting said first and second clamping means for movement in a plane substantially transverse to said axis of rotation.

4. The workpiece positioning apparatus according to claim 3, wherein each of said first and second clamping means comprises a first jaw means for supportingly engaging a portion of said workpiece; a second jaw means, pivotally connected to said first jaw means, for engaging said portion of said workpiece, said second jaw means movable from a first position free of said portion of said workpiece to a second position engaging said portion of said workpiece, whereby said portion of said workpiece is clampable between said first and second jaw means; biasing means, operatively connected to said first and second jaw means, for yieldably urging said second jaw means to said first position; pressure applying means operatively connected to said first and second jaw means, for applying pressure to said second jaw means to move said second jaw means to said second position; slide means, connected to said first jaw means, for slidingly engaging said first planar support means; and locking means, operatively connected to said slide means, for releasably locking said first jaw means to said planar support means.

5. The workpiece positioning apparatus according to claim 4, wherein said first planar support means comprises a first planar support member having a pair of parallel edges, said pair of parallel edges disposed substantially transversely to said axis of rotation; said slide means comprises a pair of slide members, each slide member slidingly receivably engaging a respective edge of said pair of parallel edges, said slide means permitting movement of said first jaw means in a direction parallel to said parallel edges and preventing movement of said first jaw means in a direction transverse to said parallel edges.

6. The workpiece positioning apparatus according to claim 1, wherein said first support means comprises a second planar support means for supporting said workpiece holding means, said second planar support means disposed in a plane substantially transverse to said axis of rotation; spacer means for holding said workpiece holding means and said second planar support means in spaced apart parallel relationship, said spacer means slidingly engaging said second planar support means; and pivot means, having pivot axis aligned with said axis of rotation, for pivotally connecting said workpiece holding means and said second planar support means to one another for relative rotary movement about said axis of rotation.

7. The workpiece positioning apparatus according to claim 6, wherein said workpiece holding means comprises a first planar member disposed substantially transversely to said axis of rotation, said first planar member having a top side and a bottom side, said bottom side of said first planar member contacting said spacer means; said first planar member having first means defining an aperture therethrough having an axis; said second planar support means comprises a second planar support member disposed substantially transversely to said axis of rotation, said second planar support member having a top side and a bottom side, said top side of said second planar member contacting said spacer means; said second planar member having second means defining an aperture therethrough having an axis.

8. The workpiece positioning apparatus according to claim 7, wherein said pivot means comprises a first clamp member having an axis coaxially aligned with said axis of rotation, said first clamp member having a first portion disposed parallel to said axis of rotation and a second portion disposed substantially transverse to said axis of rotation, said first portion coaxially slidingly received within said first means defining an aperture and said second means defining an aperture, said second portion slidingly engaging said top side of said first planar member; a second clamp member, having an axis, slidingly coaxially disposed about said first portion of said first clamp member, said second clamp member engagable with said bottom side of said second planar support member; and biasing means, operatively connected to said first clamp member and said second clamp member, for yieldably urging said second clamp member axially toward said second portion of said first clamp member.

9. The workpiece positioning apparatus according to claim 8, wherein said spacer means includes a third means defining an aperture having an axis, said first portion of said first clamp member received within said third means defining an aperture.

10. The workpiece positioning apparatus according to claim 9, wherein said spacer means comprises a first plate member in contact with said first planar member, a second plate member in contact with said second planar member, and a third plate member interposed between said first and second plate members, said third plate having a lever arm portion extending parallel to and spaced apart from said second plate member; said first planar member, said first plate, said second plate and said third plate rigidly connected together for rotation about said axis of rotation.

11. The workpiece positioning apparatus according to claim 10, wherein said rotation actuation means is fixedly connected to said second planar member and comprises means for applying a force to said lever arm portion of said third plate.

12. The workpiece positioning apparatus according to claim 11, wherein said lever arm is provided with a slot therein; said rotation actuation means comprising a substantially circular disc-like bearing disposed within said slot parallel to said lever arm, said disc-like bearing having a center; an aperture formed in said disc-like bearing remote from said center of said disc; a shaft passing through said aperture, one end of said shaft releasably rotatably supported by said first planar member, the other end of said shaft fixedly connected to a manually grippable handle for rotating said shaft, said shaft being rotatable within said aperture; and a pin disposed coaxially with said center of said disclike bearing, said pin fixedly connecting said disclike bearing and said handle; whereby rotation of said handle produces eccentric rotation of said disclike bearing about said shaft, which in turn causes said bearing to apply force to said lever arm.

13. The workpiece positioning apparatus according to claim 1, wherein said second support means comprising first resilient support means for resiliently supporting said first support means for movement substantially transversely of said axis; and third planar support means for supporting said first resilient support means, said third planar support means movable substantially transversely of said axis.

14. The workpiece positioning apparatus according to claim 13, wherein said first resilient support means comprises a plurality of first resilient members, each of said plurality of resilient members having a top and a bottom, each of said tops rigidly connected to said first support means, each of said bottoms rigidly connected to said third planar support means, 15. The workpiece positioning apparatus according to claim 14, wherein said first translation means comprises first force generating means for generating a force directed in said first direction; first linkage means, operatively connected to said first force generating means, for transmitting said force in said first direction to said first support means; first anchor means, connected to said first force generating means, for fixedly connecting said first force generating means to said third planar support means.

16. The workpiece positioning apparatus according to claim 15, wherein said first force generating means comprises a tubular member having an axis aligned along said first direction, said tubular member having a threaded axial bore therethrough; a correspondingly threaded first rod threadingly received in said axial bore; whereby rotation of said threaded first rod in said axial bore in a first rotary direction generates a force in said first direction and rotation of said threaded first rod in said axial bore in a direction opposite to said first rotary direction generates a force in a direction opposite to said first direction; said first force generating means further comprising manually grippable handle means, connected to said thraeded first rod, for rotating said threaded first rod in said first rotary direction or said direction opposite to said first rotary direction.

17. The workpiece positioning apparatus according to claim 16, wherein said first anchor means comprises a first block member ridigly connected to said third planar support means, said first block member having an aperture therethrough, said aperture having an axis aligned along said first direction, said tubular member coaxially received within said aperture; and lock means for fixedly releasably retaining said tubular member in said aperture.

18. The workpiece positioning apparatus according to claim 17, wherein said first linkage means comprises a first link pin member, said first link pin member pivotally engaged with said first support means and pivotally engaged with said threaded first rod.

19. The workpiece positioning apparatus according to claim 18, wherein said first force generating means includes stop means for limiting the amount of rotation in said direction opposite said first rotary direction so that said link pin member is always subjected to compressive force.

20. The workpiece positioning apparatus according to claim 1, wherein said third support means comprises second resilient support means for resiliently supporting said second support means for movement substantially transversely of said axis; and fourth planar support means for supporting said second resilient support means, said fourth planar support means fixedly positionable relative to said tool.

21. The workpiece positioning apparatus according to claim 20, wherein said second resilient support means comprises a plurality of second resilient members, each of said plurality of resilient members having a top and a bottom, each of said tops rigidly connected to said second support means, each of said bottoms rigidly connected to said fourth planar support means.

22. The workpiece positioning apparatus according to claim 21, wherein said second translation means comprises second force generating means for generating a force directed in said second direction; second linkage means, operatively connected to said second force generating means, for transmitting said force in said second direction to said second support means; said second force generating means fixedly connected to said fourth planar support means.

23. The workpiece positioning apparatus according to claim 22, wherein said second force generating means comprises a second block member fixedly connected to said fourth planar support means, said second block member having a threaded bore therethrough, said threaded bore having an axis aligned with said second direction; a correspondingly threaded second rod threadingly received in said threaded bore; whereby rotation of said threaded second rod in said bore in a first rotary direction generates a force in said first direction and rotation of said threaded second rod in said bore in a direction opposite to said first rotary direction generates a force in a direction opposite to said first direction; said second force generating means further comprising manually grippable handle means, connected to said threaded second rod, for rotating said threaded second rod in said first rotary direction or said direction opposite to said first rotary direction.

24. The workpiece positioning apparatus according to claim 23, wherein said second linkage means comprises a second link pin member pivotally engaged with said second support menas and pivotally engaged with said threaded second rod.

25. The workpiece positioning apparatus according to claim 24, wherein said second force generating means includes stop means for limiting the amount of rotation in said direction opposite said first rotary direction so that said link pin member is always subjected to compressive force.

26. The workpiece positioning apparatus according to claim 13, wherein said third planar support means comprises a first plate member disposed substantially transversely to said axis, said first plate member movable transversely of said axis; a second plate member disposed substantially transversely to said axis, said second plate member movable transversely of said axis, said second plate member below and in sliding contact with said second plate member; and lock means for releasably fixedly connecting said first plate member to said second plate member; said first resilient support means rigidly connected to said first plate member; said third support means rigidly connected to said second plate member.

27. The workpiece positioning apparatus according to claim 26, wherein said third support means comprises second resilient support means for resiliently supporting said second support means for movement substantially transversely of said axis; and fourth planar support means for supporting said second resilient support means, fixedly positionable relative to said tool; said second resilient support means rigidly connected to said second plate member.

28. A workpiece positioning apparatus for adjusting the position of a workpiece relative to a tool, said workpiece positioning apparatus comprising:
workpiece holding means, having an axis rotation, for releasably holding a workpiece, said workpiece holding means rotatable about said axis;
first support means for rotatably supporting said workpiece holding means for rotation about said axis, said first support means including rotation actuation means for rotating said workpiece holding means about said axis of rotation, said first support means movable substantially transversely of said axis;
first resilient support means for resiliently supporting said first support means for movement substantially transversely of said axis;
second support means for supporting said first resilient support means, said second support means movable substantially transversely of said axis, said first resilient support means yieldably resisting relative movement between said first support means and said second support means;
second resilient support means for resiliently supporting said second support means for movement substantially tranasversely of said axis;
third support means for supporting said second resilient support means, said third support means fixedly positionable relative to said tool, said second resilient support means yieldably resisting relative movement between said second support means and said third support means;
first translating means for moving said first support means in a first direction substantially transverse to said axis relative to said second support means;
second translating means for moving said second support means in a second direction substantially transverse to said axis relative to said third support means, said first direction being substantially transverse to said second direction.

29. The workpiece positioning apparatus according to claim 28, wherein said first translating means is rigidly connected to said second support means; and said second translating means is rigidly connected to said third support means.

30. The workpiece positioning apparatus according to claim 28, wherein said workpiece holding means comprises a first clamping means for clampingly engaging a first portion of said workpiece and a second clamping means for clampingly engaging a second portion of said workpiece, said first clamping means movable substantially transversely of said axis, said second clamping means movable substantially transversely of said axis.

31. The workpiece positioning apparatus according to claim 30, wherein said workpiece holding means further comprises a planar support means for supporting said first and second clamping means for movement in a plane substantially transverse to said axis.

32. The workpiece positioning apparatus according to claim 28, wherein said first support means comprises a first planar support means for supporting said workpiece holding means, said first planar support means disposed substantially transverse to said axis; spacer means for holding said first plannar support means and said workpiece holding means in spaced apart relationship, said spacer means fixedly connected to said workpiece holding means, said spacer means slidably engaging said first planar support means, clamping means, having an axis coaxially aligned with said axis of rotation, for holding said workpiece holding means and hence said spacer means in sliding engagement with said first planar support means.

33. The workpiece positioning apparatus according to claim 32, wherein said spacer means further comprises a lever arm disposed parallel to and spaced apart from said first plnar support, said lever arm having a slot therein; said rotation actuation means comprising a substantially circular disc-like bearing disposed within said slot parallel to said lever arm, said disc-like bearing have a center of rotation; an aperture formed in said disc-like bearing remote from said center of rotation; a shaft passing through said aperture, one end of said shaft releasably rotatably supported by said first planar support means, the other end of said shaft fixedly connected to a manually grippable handle for rotating said shaft, said shaft rotatable within said aperture; a pin disposed coaxially with said center of rotation, said pin fixedly connecting said disc-like bearing and said handle.

34. A positioning apparatus for adjusting the position of a printed circuit board relative to a soldering/desoldering device, said positioning apparatus comprising:

printed circuit board holding means, having an axis of rotation, for releasably holding said printed circuit board, said holding means rotatable about said axis;

first support means for rotatably supporting said holding means for rotation about said axis, said first support means movable substantially transversely of said axis;

second support means for resiliently supporting said first support means for movement substantially transversely of said axis, said second support means yieldably resisting relative movement between said first support means and second support means, said second support means movable substantially transversely of said axis;

third support means for resiliently supporting said second support means for movement substantially transversely of said axis, said third support means yieldably resisting relative movement between said second support means and said third support means, said third support means fixedly positionable relative to said soldering/desoldering device;

rotation actuation means, operatively connected to said printed circuit board holding means and said first support means, for rotating said printed circuit board holding means about said axis of rotation relative to said first support means;

first translation means, operatively connected to said first support means and said second support means, for moving said first support means, relative to said second support means, in a first direction substantially transverse to said axis of rotation;

second translation means, operatively connected to said second support means and said third support means, for moving said second support means, relative to said third support means, in a second direction substantially transverse to said axis of rotation, said second direction substantially transverse to said first direction.

* * * * *